(12) United States Patent
Fleming, Jr. et al.

(10) Patent No.: US 6,305,195 B1
(45) Date of Patent: Oct. 23, 2001

(54) PROCESS FOR FABRICATING SILICA ARTICLE INVOLVING JOINING OF DISCRETE BODIES

(75) Inventors: James William Fleming, Jr., Westfield; George John Zydzik, Columbia, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/321,076

(22) Filed: May 27, 1999

(51) Int. Cl.[7] .......................... C03B 37/018; C03C 25/00
(52) U.S. Cl. .................. 65/391; 65/406; 65/435; 65/433; 65/436; 65/36; 65/385; 156/89.11; 156/308.2; 264/430; 264/483
(58) Field of Search ................ 65/36, 406, 391, 65/385, 435, 433, 436; 264/430, 483; 156/308.2, 89.11

(56) References Cited

U.S. PATENT DOCUMENTS

| | | | |
|---|---|---|---|
| 2,564,738 | * | 8/1951 | Tank et al. . |
| 3,571,559 | * | 3/1971 | Becker et al. . |
| 4,390,384 | * | 6/1983 | Turner . |
| 4,724,020 | * | 2/1988 | Ebata et al. . |
| 4,900,389 | * | 2/1990 | Schnell et al. . |
| 5,509,952 | * | 4/1996 | Moore et al. ................ 65/406 |
| 5,551,968 | * | 9/1996 | Pan .......................... 65/433 |
| 5,578,106 | * | 11/1996 | Fleming, Jr. et al. . |
| 5,689,608 | * | 11/1997 | Moore et al. ................ 65/406 |
| 6,178,779 | * | 1/2001 | Drouart et al. ............... 65/391 |

FOREIGN PATENT DOCUMENTS

| | | |
|---|---|---|
| 2932196A | 2/1981 | (DE) . |
| 3929894A | 3/1991 | (DE) . |
| 0656325 | 6/1995 | (EP) . |
| 0950643A | 10/1999 | (EP) . |
| 61197440 | 1/1987 | (JP) . |
| 5024877 | * 2/1993 | (JP) . |
| 05024877 | 2/1993 | (JP) . |
| 10330130 | * 11/1994 | (JP) . |
| 6329443 | * 11/1994 | (JP) . |
| 06329433 | 11/1994 | (JP) . |
| 08109036 | 4/1996 | (JP) . |
| 10081529 | 3/1998 | (JP) . |
| 10330130 | 12/1998 | (JP) . |

OTHER PUBLICATIONS

F. DiMarcello et al. "Fiber Drawing and Strength Properties," *Optical Fiber Communications*, vol. 1, Academic Press, Inc., pp. 179–248 (1995).

* cited by examiner

Primary Examiner—Michael P. Colaianni
(74) Attorney, Agent, or Firm—Scott J. Rittman

(57) ABSTRACT

An improved process for fabricating a refractory dielectric article, in particular silica optical fiber, is provided. The fabrication process involves joining of two elongated bodies—typically silica preforms—end-to-end by use of an isothermal plasma torch technique. A long preform made in this manner allows drawing of optical fiber with less downtime and waste than current processes. The plasma torch technique also produces low perturbations within the resultant preform, thereby increasing the amount of usable fiber.

22 Claims, 3 Drawing Sheets

PROCESS FOR FABRICATING SILICA ARTICLE INVOLVING JOINING OF DISCRETE BODIES

BACKGROUND OF THE INVENTION

1. Field of the Invention

The invention relates to optical fiber fabrication.

2. Discussion of the Related Art

Glass optical fiber has become a significant transmission medium in recent years, and its prevalence in communications systems is expected to increase. Glass optical fiber is generally produced from a glass preform, the preform typically consisting of a doped silica core surrounded by an inner silica cladding and a silica overcladding. As reflected in FIG. 1, and discussed in F. DiMarcello et al. "Fiber Drawing and Strength Properties," *Optical Fiber Communications*, Vol. 1, Academic Press, Inc., 1995, at 179–248, the preform 12 is generally arranged vertically in a draw tower 10 such that a portion of the preform 12 is lowered into a furnace region 14 that typically heats the preform 12 to temperatures around 2200° C. The portion of the preform 12 placed into the furnace region 14 begins to melt, and the lower end of the preform 12 forms what is known as the neck-down region 16, which is where the preform glass flows from the original cross-sectional area of the preform 12 to the desired cross-sectional area of the fiber 18. From the lower tip of this neck-down region 16, the optical fiber 18 is drawn. As the preform glass is drawn into fiber 18, the preform 12 continues to be lowered into the furnace region 14, until the preform 12 is exhausted.

Clearly, the need to interrupt this fiber drawing process to put a new preform in place reduces efficiency of the process and reduces the consistency of the resultant fiber. Specifically, significant down-time is accumulated when putting new preforms in place and performing the initial drop of the preform into draw position. Moreover, significant waste is generated in re-establishing the draw from each new preform. Thus, techniques for fabricating more fiber from a single preform have been sought. However, the length of preforms is somewhat limited by the processes used to make them, and increasing preform diameter has therefore been considered to be the primary method for improving the efficiency of fiber fabrication. Yet, the parameters for consistently obtaining commercially acceptable fibers from such larger diameter preforms are not clear. Problems encountered with the current preforms are likely to be exacerbated in larger diameter preforms, and new, unforeseen problems are also likely to arise.

Thus, improved methods for more efficiently fabricating optical fiber are desired, in particular methods that reduce down-time and waste.

SUMMARY OF THE INVENTION

The invention provides an improved process for fabricating a refractory a dielectric article, in particular silica optical fiber. The fabrication process involves joining of two elongated bodies—typically silica preforms—end-to-end by use of an isothermal plasma torch technique. A long preform made in this manner allows drawing of a substantial length of optical fiber with less down-time and waste than current processes. In fact, according to the invention, a continuous draw process is possible, in which discrete preforms are successively joined to the top end of a preform from which fiber is being drawn. The plasma torch technique also is able to produce a low level of perturbations around the joint area, as well as a low level of impurities such as OH, such that any detrimental effect of the joint on the drawn fiber is kept similarly low. (Refractory indicates a ceramic material of relatively low thermal conductivity that is capable of withstanding temperatures of up to about 1600° C. without essential change. Dielectric indicates an electrically insulating material, i.e., a material having a resistivity of about $10^6$ ohm-cm or greater.)

According to the invention, a first elongated refractory dielectric body having at least one end face and a second elongated refractory dielectric body having at least one end face are provided. The bodies are oriented such that end faces are opposite each other, and these opposing end faces are heated with an isothermal plasma torch to lower the viscosity of, e.g., liquify, the end faces. At least one of the bodies is then moved until the end faces are joined. Advantageously, the bodies are silica-based optical fiber preforms. At least one of the preform end faces typically has a conical shape, e.g., at an angle of 3° or less, such that melting and joining of the two ends provides a desirable joint substantially free of defects and porosity. The ends of the preforms are typically placed a few centimeters apart or less prior to heating, and the preforms are generally rotated during heating and joining. After joining, excess glass and/or deposited soot produced at the joint is able to be removed with the torch, and the preform is then ready for fiber fabrication. In the case of a continuous fiber draw process, a first preform (which may be a joined preform) is placed into a draw furnace, fiber draw is initiated, and an second preform is joined to the top of the first preform by the technique presented herein.

DETAILED DESCRIPTION OF THE INVENTION

The invention relates to a process for fabricating an article. According to the invention, a first elongated refractory dielectric body having at least one end face and a second elongated refractory dielectric body having at least one end face are provided. The bodies are oriented such that end faces are opposite each other, and an isothermal plasma torch is used to lower the viscosity of, e.g., liquify, these opposing end faces. At least one of the bodies is then moved toward the other until the end faces are joined. Advantageously, the bodies are silica-based optical fiber preforms, such that the resultant article produced by the invention is optical fiber. The discussion herein relates primarily to joining of such preforms, but is equally applicable to other refractory dielectric bodies, including core rods or overcladding tubes also used in optical fiber fabrication.

An isothermal plasma torch is used for heating the end faces of the bodies, isothermal indicating that the ion temperature and electron temperature are substantially the same in the plasma. The plasma of an isothermal plasma torch typically contains electrically conducting regions with a center region in which the plasma temperature is the highest. A plasma fireball is defined as the region containing the electrically conducting portion of the plasma, into which the plasma-sustaining electromagnetic energy is coupled. A variety of isothermal plasmas are expected to be useful. Examples include oxygen and oxygen-containing plasma, e.g., oxygen/argon. The plasma is typically hydrogen-free, such that OH impurities in the resulting article are substantially avoided.

Figure 2:
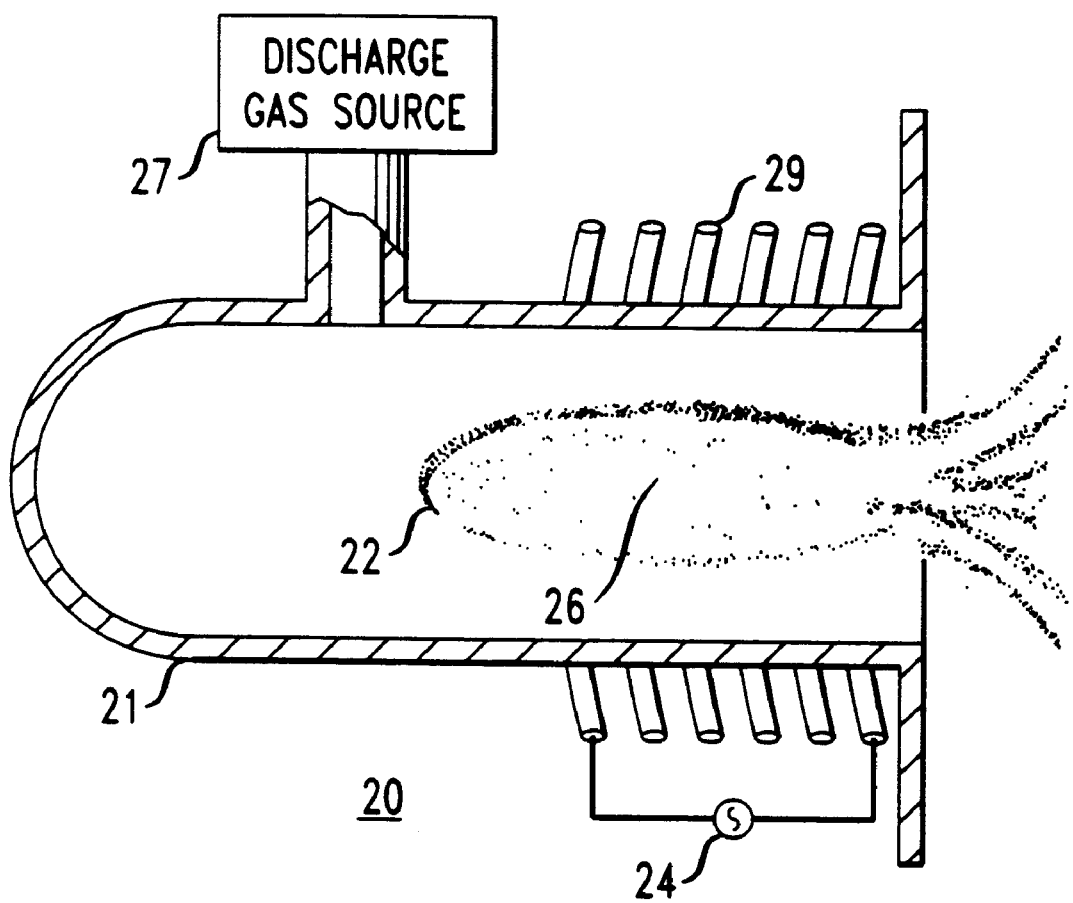
FIG. 2 illustrates a typical isothermal plasma torch.

A typical isothermal plasma torch 20 is shown in FIG. 2. The torch 20 contains a fused silica mantle 21 connected to a gas source 27. The gas source 27 delivers the gas used for the plasma discharge into the mantle 21, and the plasma fireball 22 is excited by a radio frequency (RF) coil 29 and RF generator 24. The fireball 22 is typically contained primarily within the torch, with the center 26 of the fireball 22 typically located approximately at the middle of the RF coil 29. The torch 20 is typically mounted such that it is capable of being vertically adjusted and tilted to allow a desired arrangement of the fireball 22. In addition, as discussed in co-assigned U.S. Pat. No. 5,000,771, it is possible to configure a torch such that the fireball is pushed further outside the mantle. Such a configuration is useful in the invention for increasing the extent of contact with the end faces of the bodies to be joined.

Figure 3:
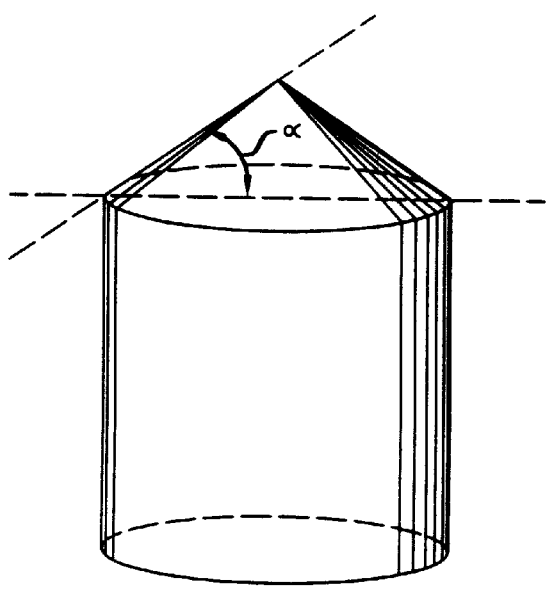
FIG. 3 illustrates a conical end face of a body according to the invention.

The bodies to be joined are typically elongated rods, although a variety of other configurations are capable of being joined. To prepare the rods for joining, end faces substantially perpendicular to the long axis are generally provided, e.g., by cutting or grinding. (Substantially perpendicular indicates that any edge-to-edge line passing across the end face and through the long axis of the body is within about 10 degrees of the normal to the long axis.) In addition, to improve the overall joint, at least one of the end faces is typically provided with a conical shape—e.g., a mild conical shape having an angle of 3° or less. (As shown in FIG. 3, the angle, $\alpha$, is measured between a normal to the long axis of the rod and a line from the conical point to the edge of the rod. A conical configuration does not change the above-defined determination of whether the end face is substantially perpendicular to the long axis.) The conical shape promotes a uniform, defect-free joint. Specifically, by initiating contact between the end faces at the center of the rods, the likelihood of voids is substantially reduced. This conical configuration is particularly useful for optical fiber fabrication, where voids or other defects in a preform have the capability of causing breakage during fiber draw. In addition, it is possible to grind the tip of the cone flat, e.g., over a diameter of about 1 mm. Such a flat tends to reduce the spread of core material when optical fiber preforms are joined.

Rods of relatively small or large diameter are able to be joined. For example, silica optical fiber preforms 90 mm in diameter are able to be joined. The diameter of the bodies to be joined is only limited by the ability to heat the end faces adequately. Specifically, for a body being rotated in front of the plasma torch, the torch fireball advantageously contacts at least half the surface area of the end face. Otherwise, it is possible for the end face to soften or liquify unevenly, leading to a non-uniform or defect-containing joint. A muffle around a portion of the bodies near the end faces has been found to be useful to improve the uniformity of heating by reducing the heat losses incurred when portions of the end faces momentarily rotate away from the fireball. Such a muffle typically takes the form of a tube placed around the bodies at the joint area, the tube having a section removed for introduction of the plasma fireball.

Figure 4A:
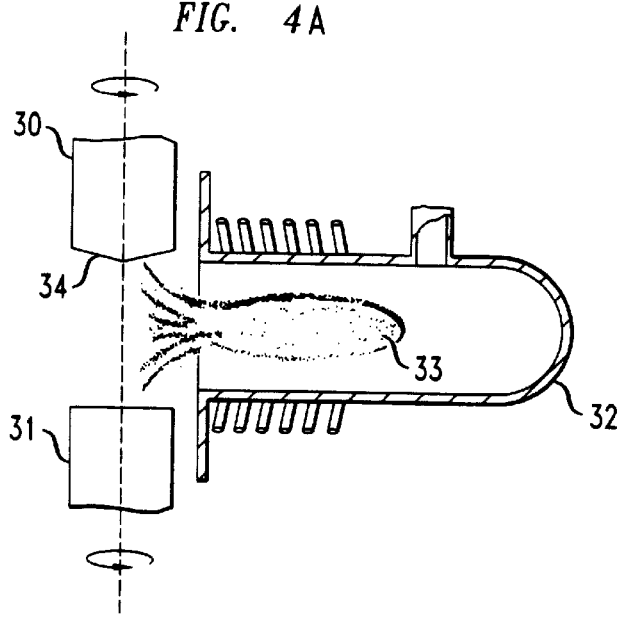
FIGS. 4A–4C illustrate a joining technique according to the invention.
Figure 4B:
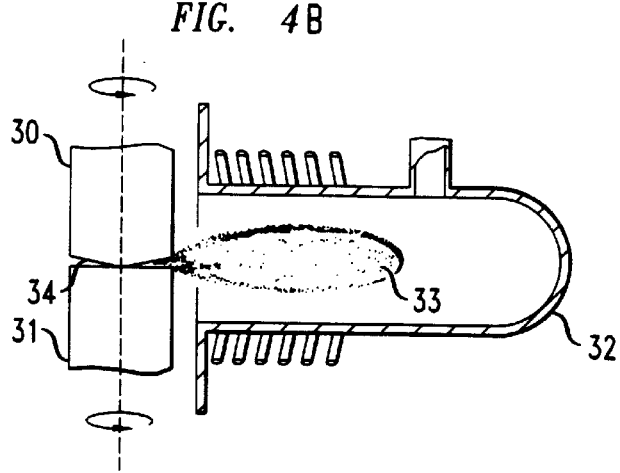
Figure 4C:
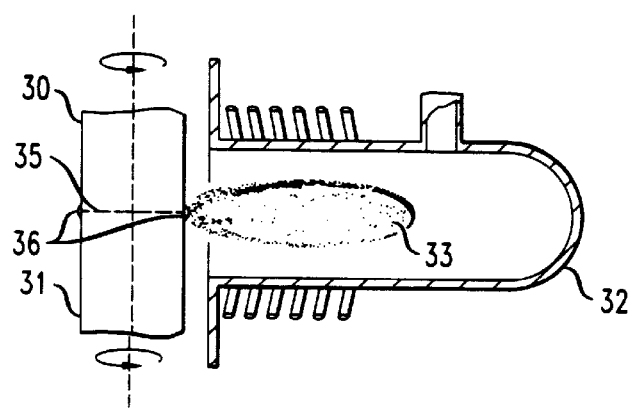

To join the bodies, as reflected in FIG. 4A, the bodies 30, 31 are oriented such that the end faces are opposite each other. The distance between the end faces typically ranges from about 1 cm to about 3 cm, with large diameter bodies generally requiring the closer spacing. The bodies 30, 31 are generally rotated to attain uniform heating, particularly when joining larger diameter bodies, for which uniform heating is more difficult. The plasma torch 32 is initiated, and one or both of the bodies 30, 31 are moved such that the end faces approach each other. Typically, this movement is delayed for a short time, e.g., a few minutes, to allow the plasma fireball 33 to heat and reduce the viscosity of the end faces. Such movement generally occurs at a rate of about 5 to about 60 cm/minute. The plasma torch 32, due to its high heat and temperature, is able to support a large thermal gradient, and thereby provides a relatively thin, low-viscosity, e.g., liquefied, region. This region keeps unwanted perturbations within the bodies 30, 31 small. As shown in FIG. 4B, where a conical end face 34 is present, contact initiates at the center of the body and moves outward, providing a relatively uniform joint. Movement of the bodies 30, 31 toward each other is ceased once the joint 35 reaches the edge of the bodies, as shown in FIG. 4C. Excess material 36 is typically generated at the joint, due to the pressing of liquefied material between the bodies. The plasma torch is useful for removing such excess material, as well as any deposited material such as soot generated during the joining process. Typically, initiation of end face heating to joint formation takes less than 10 minutes, more typically less than 5 minutes (without removal of excess or deposited material). Removal of excess and/or deposited material adds an additional 10 to 25 minutes.

For silica bodies, the plasma torch is generally operated such that the end faces of the bodies are heated to a surface temperature of at least 2200° C. (as measured, for example, by use of an infrared pyrometer). Typically, for joining silica bodies, a useful range for plasma torch power (i.e., RF generator power) is about 40 to about 60 kW, generally at about 1 to about 5 MHz. An oxygen or oxygen-containing plasma is also useful for silica bodies, typically at a flow rate of about 20 to about 100 liters/minute (oxygen-containing indicates that oxygen is purposefully introduced and is present in an amount of at least 50 vol. %).

In the case of optical fiber preforms, once discrete preforms are joined, the resultant, longer preform is able to be used in a conventional optical fiber drawing process, as discussed above. It is possible that fiber drawn from the joint area will meet the specifications for the fiber being manufactured. Due to perturbations created in the preform by the joining process, however, it is also possible that the fiber drawn from the joint area will not meet such specifications. In the latter case, it is not necessary to interrupt the draw process to remove such undesired fiber during drawn. It is more efficient to later remove such undesired fiber by an off-line spooling method. For example, the location of the undesired fiber is able to be easily marked or recorded, such that later automated removal is possible.

Figure 1:
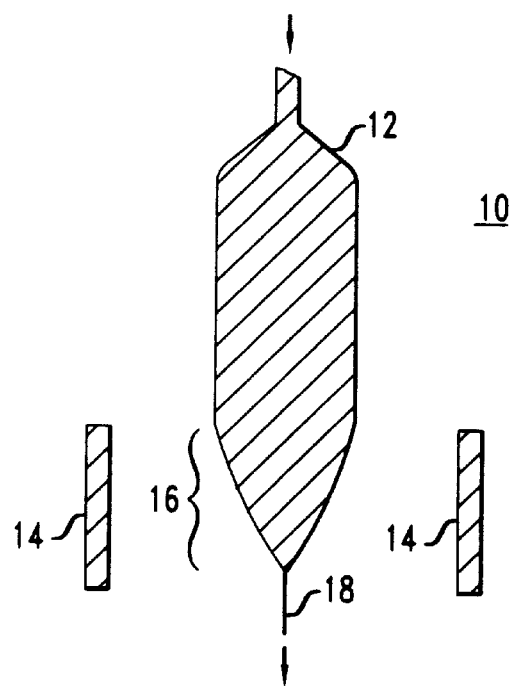
FIG. 1 illustrates a typical optical fiber draw process.

It is also possible to join a preform to a draw tip. As used herein, a draw tip refers to a preform body in which the neck-down region (illustrated in FIG. 1 as element 16) is already present. Such draw tips are provided either by pre-treated an existing preform, or, more likely, by taking the remaining stub at the end of an optical fiber draw. Specifically, optical fiber draw is ceased when there remains only a small portion of the original-diameter preform behind the neck-down region. This stub, i.e., draw tip, is no longer suitable for drawing additional fiber, but, according to the invention, is able to be joined to another preform. In this manner, the time and waste involved in forming the neck-down region from a new preform is substantially avoided. (A draw tip is considered to be an elongated body for purposes of the invention.)

A continuous fiber draw process is also contemplated according to the invention. In such a continuous fiber draw process, a first preform is placed into a draw furnace and fiber draw is commenced. A second preform is joined to the top of the first preform while fiber is being drawn, according to the joining technique described herein. As necessary, additional preforms are joined to maintain the draw process as long as is desired.

The invention will be further clarified by the following example, which is intended to be exemplary.

EXAMPLE 1

Two silica-based optical fiber preforms having diameters of 90 mm were obtained. Each preform was cut normal to the long axes of the preforms to provide end faces to be joined. The end face of one preform was provided with a conical shape on its end face, at an angle of about 3°, with the point of the cone ground flat to about a 1 mm diameter. The preforms were mounted in lathe chucks, the end faces were placed about 1 to 1.5 cm apart, and the preforms were rotated (at the same speed and direction) at a rate of about 20 rpm. An isothermal plasma torch running an oxygen plasma was positioned such that the plasma fireball partially entered the gap between the end faces. The torch was operated at about 50 kW at about 3 MHz, and at an oxygen flow of about 60 liter/minute. The end faces were heated by the fireball for about 4 minutes, which lowered the viscosity of a thin surface layer, and then the preforms were moved toward each other at a rate of about 20 cm/minute. The tip of the conical end face initiated contact between the end faces, and the joint then moved to the edges of the preforms. Movement toward each other was ceased when the joint reached the edges. Once movement of the bodies toward each other was initiated, joint formation took about 3 seconds.

The joint formation led to excess silica at the periphery of the joint, which was removed by continued heating by the plasma torch (at the same parameter) for about 5 to 15 minutes. Deposited soot was similarly removed from the preform surface near the joint by heating for about 5 minutes (at the same parameters). The resulting preform contained a robust joint which was not visible to the naked eye.

EXAMPLE 2

An optical fiber preform having a diameter of 90 mm and a draw tip containing a remaining portion of 90 mm diameter were obtained. The two bodies were joined according to the process of Example 1. The resulting preform similarly contained a robust joint which was not visible to the naked eye.

Other embodiments of the invention will be apparent to those skilled in the art from consideration of the specification and practice of the invention disclosed herein.

What is claimed is:

1. A process for fabricating an article, comprising the steps of:

providing a first elongated refractory dielectric body have at least one end face and a second elongated refractory dielectric body having at least one end face;

orienting the first and second bodies such that end faces of the first body and the second body are opposite each other wherein the opposing end faces are substantially perpendicular to the longitudinal axis of the first and second bodies, and wherein at least one of the opposing end faces comprises a conical shape;

heating the opposing end faces of the first and second bodies with an isothermal plasma torch, such that the plasma is formed between the end faces and the viscosity of the end faces is lowered; and moving at least one of the bodies such that the heated opposing end faces move together until the end faces are joined.

2. The process of claim 1, wherein the first and second bodies comprise silica.

3. The process of claim 1, wherein the conical shape has an angle of 3° or less.

4. The process of claim 1, further comprising the step of rotating the first and second bodies around the longitudinal axes of the bodies during the heating and moving steps.

5. The process of claim 2, wherein at least one of the bodies is an optical fiber preform.

6. The process of claim 5, further comprising the steps of placing the joined body into a draw furnace, and drawing optical fiber from the body.

7. The process of claim 5, wherein the first body is an optical fiber preform and the second body is a draw tip.

8. The process of claim 1, wherein the time period beginning at heating the end faces and ending at joint formation is less than 10 minutes.

9. The process of claim 8, wherein the time period is less than 5 minutes.

10. A process for fabricating an article, comprising the steps of:

providing a first elongated body comprising silica, the first body having at least one end face, and a second elongated body comprising silica, the second body having at least one end face;

orienting the first and second bodies such that end faces of the first body and the second body are opposite each other, wherein the opposing end faces are substantially perpendicular to the longitudinal axis of the first and second bodies, and wherein at least one of the opposing end faces comprises a conical shape;

heating the opposing end faces of the first and second bodies with an isothermal plasma torch, such that the plasma is formed between the end faces and the viscosity of the end faces is lowered; and moving at least one of the bodies such that the heated opposing end faces move together until the end faces are joined.

11. The process of claim 10, further comprising the step of rotating the first and second bodies around the longitudinal axes of the bodies during the heating and moving steps.

12. The process of claim 10, wherein the conical shape has an angle of 3° or less.

13. The process of claim 10, wherein at least one of the bodies is an optical preform.

14. The process of claim 13, further comprising the steps of placing the joined body into a draw furnace, and drawing optical fiber from the body.

15. The process of claim 13, wherein the first body is an optical fiber preform and the second body is a draw tip.

16. The process of claim 13, wherein the preform has a diameter of at least 90 mm.

17. The process of claim 10, wherein the time period beginning at heating the end faces and ending at joint formation is less than 10 minutes.

18. The process of claim 17, wherein the time period is less than 5 minutes.

19. The process of claim 10, wherein the joining produces an optical fiber preform, the process further comprising the steps of:

placing the joined preform into a draw furnace; and drawing optical fiber from the preform.

20. A process for fabricating optical fiber, comprising the steps of:

placing a first optical fiber preform into a draw furnace and initiating fiber draw from the first preform, wherein the first perform comprises a first end face substantially perpendicular to the longitudinal axis of the first preform, and wherein the first preform is placed into the furnace such that the end face is opposite the end from which the draw is initiated;

providing a second preform comprising a second end face substantially perpendicular to the longitudinal axis of the second preform at least one of the first or second end faces comprises a conical shape; and subsequent to initiating fiber draw from the first preform, orienting the second perform such that the end faces of the first and second preforms are opposite each other, heating the opposing end faces of the first and second preforms with an isothermal plasma torch such that the plasma is formed between the end faces and the viscosity of the end faces is lowered, and moving the second preform such that the heating opposing end faces move together until the end faces are joined.

21. The process of claim 20, wherein the conical shape has an angle of 3° or less.

22. The process of claim 20, further comprising the step of rotating the first and second bodies around the longitudinal axes of the bodies during the heating and moving steps.

* * * * *